United States Patent [19]

Schaefer et al.

[11] 3,830,328

[45] Aug. 20, 1974

[54] PARKING BRAKE APPLY MECHANISM

[75] Inventors: Ernest D. Schaefer, Xenia; Thomas D. Naismith, Dayton, both of Ohio

[73] Assignee: General Motors Corporation, Detroit, Mich.

[22] Filed: June 29, 1973

[21] Appl. No.: 375,110

[52] U.S. Cl............... 180/82 B, 188/265, 192/3 R
[51] Int. Cl............................................. B60t 7/10
[58] Field of Search............ 180/82 R, 82 A, 82 B; 188/106 R, 265; 192/3 R

[56] References Cited
UNITED STATES PATENTS

| | | | |
|---|---|---|---|
| 1,422,221 | 7/1922 | Murray............................ | 180/82 X |
| 2,499,276 | 2/1950 | Mullins et al...................... | 192/3 R |
| 2,637,789 | 5/1953 | Critchfield et al................ | 180/82 X |
| 2,669,329 | 2/1954 | Price................................. | 192/3 R |
| 2,959,261 | 11/1960 | Hemphill.......................... | 192/3 R |
| 3,119,458 | 1/1964 | Fritz.................................. | 180/82 |
| 3,684,049 | 8/1972 | Kimura.............................. | 188/265 |

*Primary Examiner*—Duane A. Reger
*Assistant Examiner*—Galen L. Barefoot
*Attorney, Agent, or Firm*—D. D. McGraw

[57] ABSTRACT

The parking brake apply mechanism includes a handle assembly slidably mounted on the motor vehicle and attached to a parking brake actuator which applies the parking brake upon movement of the handle assembly in one direction from a normal retracted position and which releases the parking brake upon movement of the handle assembly in the other direction from the retracted position. A toggle link pivoted to the stationary member is engaged by a plunger operatively connected to the ignition lock to prevent movement of the ignition lock to locked position. Upon movement of the handle assembly in the brake applying direction, the toggle link is pivoted out of engagement of the plunger by a cam surface on the handle assembly to permit movement of the ignition lock to locked position. A shoulder on the handle assembly engages the plunger when in its position corresponding to the ignition lock being locked to prevent the handle assembly from being moved from the retracted position in a direction which releases the parking brake. Movement of the ignition lock to the unlocked position moves the plunger to then permit movement of the handle assembly in the direction to release the brake.

4 Claims, 11 Drawing Figures

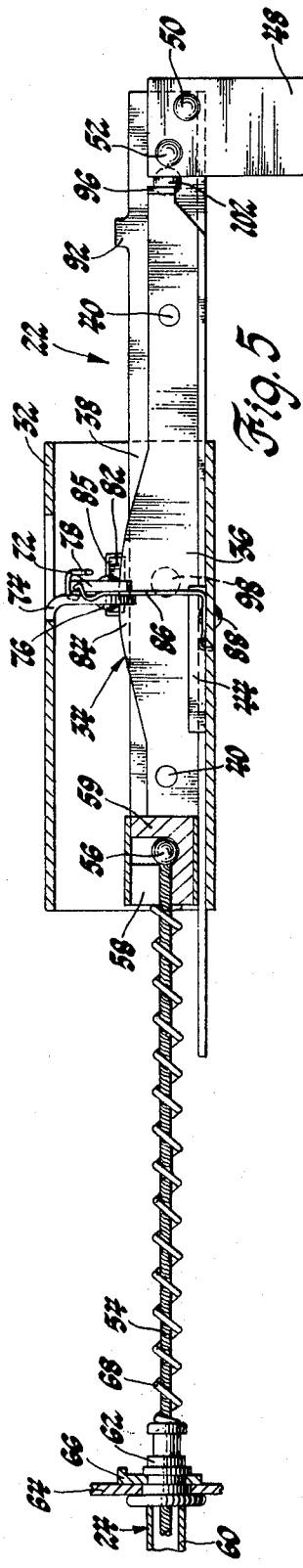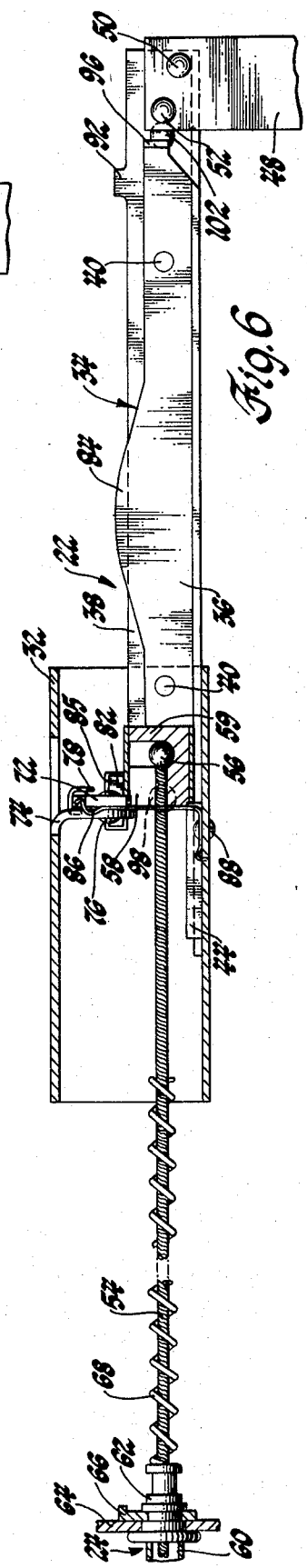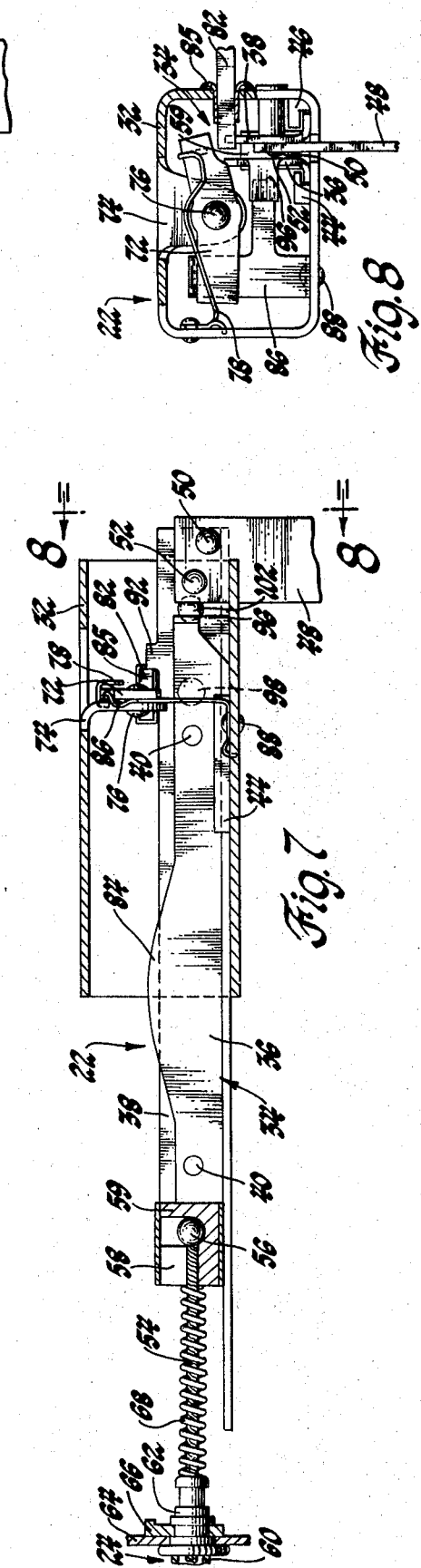

PARKING BRAKE APPLY MECHANISM

The invention relates to a parking brake apply mechanism and more particularly to a parking brake apply handle having an interlock to the ignition switch.

It is well known in motor vehicles to interconnect the ignition switch with the vehicle brakes and other control instrumentalities of the vehicle so that when the ignition is off the vehicle brakes or other control instrumentalities cannot be operated.

It is also known to provide an interlock between an ignition switch and a parking brake apply lever which prevents movement of the parking brake apply lever to the brake release position until the ignition switch has been moved from locked position.

It is also known to provide a parking brake having an operating lever which is movable in one direction from a normal retracted position to apply the parking brakes, may be returned to the normal position for storage, and is then movable in the other direction from the retracted position to release the parking brake. The present invention provides an ignition interlock for this type of parking brake apply mechanism which prevents the ignition from being locked until the parking brake has been applied and then prevents release of the parking brake until the ignition has been unlocked.

One feature of the present invention is the provision of an ignition interlock for a brake apply lever of the type movable in one direction from a stored or retracted position to apply the brakes and movable in the other direction from the normal retracted position to release the brake.

Another feature of the present invention is the provision of an interlock between a parking brake apply mechanism and an ignition lock which assures that the vehicle operator has actuated the parking brake prior to locking the ignition as well as preventing release of the parking brake until the ignition has been unlocked.

Another feature of the invention is the provision of an interlock between a parking brake apply device and the ignition switch which assures that the vehicle operator actuates the parking brake by preventing movement of the ignition switch to locked position until the parking brake has been actuated.

The parking brake apply mechanism according to the invention includes a handle assembly slidably mounted on a stationary member and attached to a parking brake actuator which applies the vehicle brakes upon movement of the handle assembly in one direction from a normal retracted position and which releases the parking brakes upon movement of the handle assembly in the other direction from the normal retracted position. The handle assembly has a cam surface and a shoulder in lateral and longitudinal spaced relation from one another. A toggle link pivoted on the stationary member is spring biased to a normal position relative the handle assembly. A plunger operatively connected to the ignition lock is movable relative the handle assembly and toggle link in response to movement of the ignition lock between locked and unlocked positions. When the toggle link is in its normal position it engages and prevents movement of the plunger to prevent movement of the ignition lock to the locked position. When the handle assembly is moved in the direction applying the parking brake, the cam surface thereof lifts the toggle link out of engagement with the plunger to permit movement of the ignition lock to locked position. A spring clip holds the toggle link in this lifted position when the handle assembly is returned to its normal retracted position. When the plunger is in its position corresponding to the ignition being in locked position, the plunger is engaged by the shoulder on the handle assembly to prevent the handle assembly from being moved in the direction which releases the parking brake. Once the ignition has been moved to unlocked position the plunger is withdrawn from engagement of the shoulder permitting movement of the handle assembly in the direction to release the parking brake. During such brake releasing movement of the sliding handle assembly a laterally extending shoulder thereof disengages the spring clip from the toggle link to permit return of the toggle link to the normal position.

These and further objects, features and advantages of the invention will become apparent upon consideration of the appended drawings in which:

FIG. 5 is a view similar to FIG. 2 showing the parking brake apply mechanism with the parking brake partially applied;

FIG. 6 is a view similar to FIGS. 2 and 5 but showing the parking brake apply mechanism in position corresponding to full brake apply;

FIG. 7 is a view similar to FIGS. 2, 5 and 6 showing the parking brake apply mechanism in its normal retracted or stored position;

FIG. 8 is an end view taken in the direction of arrows 8—8 of FIG. 7;

Figure 1:
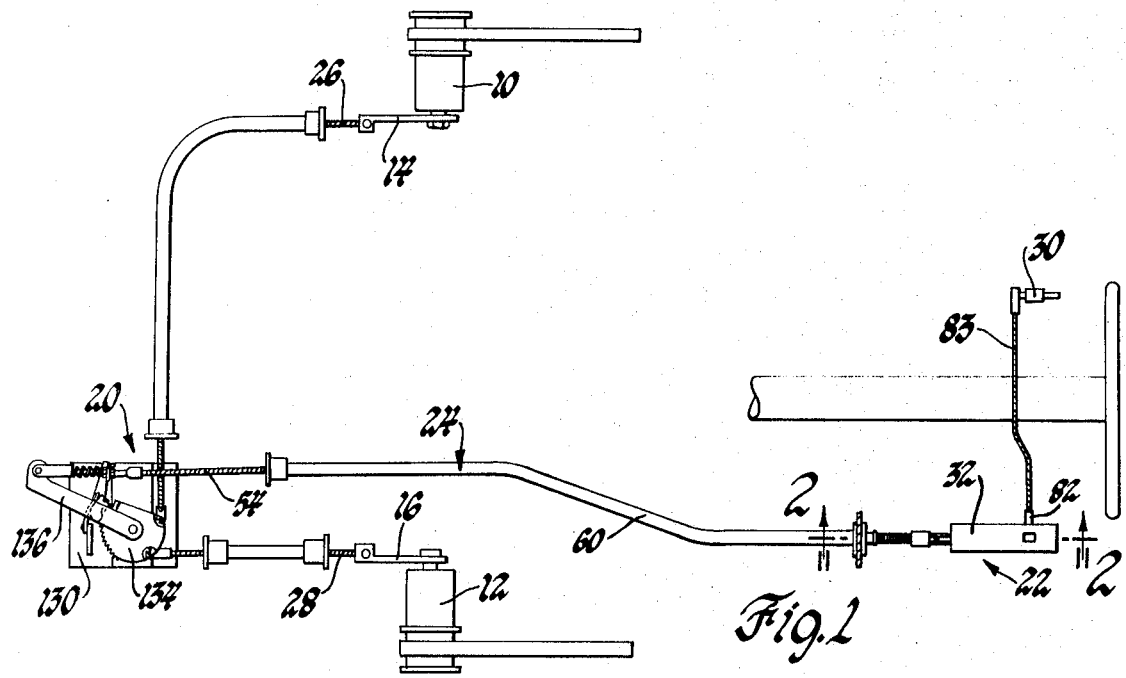
FIG. 1 is a schematic illustration of a brake system embodying the invention.

Referring to FIG. 1, a brake system of a motor vehicle embodying the invention is shown. The brake system includes a right front disc brake caliper 10 and a left front disc brake caliper 12. These brake calipers include hydraulic service brake actuating means and integral mechanical parking brake actuators which are applied by rotation of levers 14 and 16. Disc brakes of this type are well known in the prior art and may for example be the "Disc Brake Caliper with Integral Parking Brake" for U.S. Pat. No. 3,688,875 by Ernest D. Schaefer and Edward J. De Hoff, and assigned to the assignee of this invention.

The parking brake apply system includes a parking brake actuator, generally designated at 20, and a parking brake apply mechanism, generally designated at 22. Parking brake actuator 20, as will be further discussed herein, is operated by a push-pull cable assembly 24 and is in turn connected to the levers 14 and 16 of the disc brake calipers 10 and 12 by sheathed cables 26 and 28. The parking brake actuator 20 includes a linkage for tensioning the cables 26 and 28 upon tensioning of the push-pull cable 24 and also has a locking pawl arrangement to maintain the tension in the cables 26 and 28. The parking brake apply mechanism 22 includes an apply handle and an ignition interlock mechanism connected to the ignition switch 30 as will be discussed hereinafter.

Figure 9:
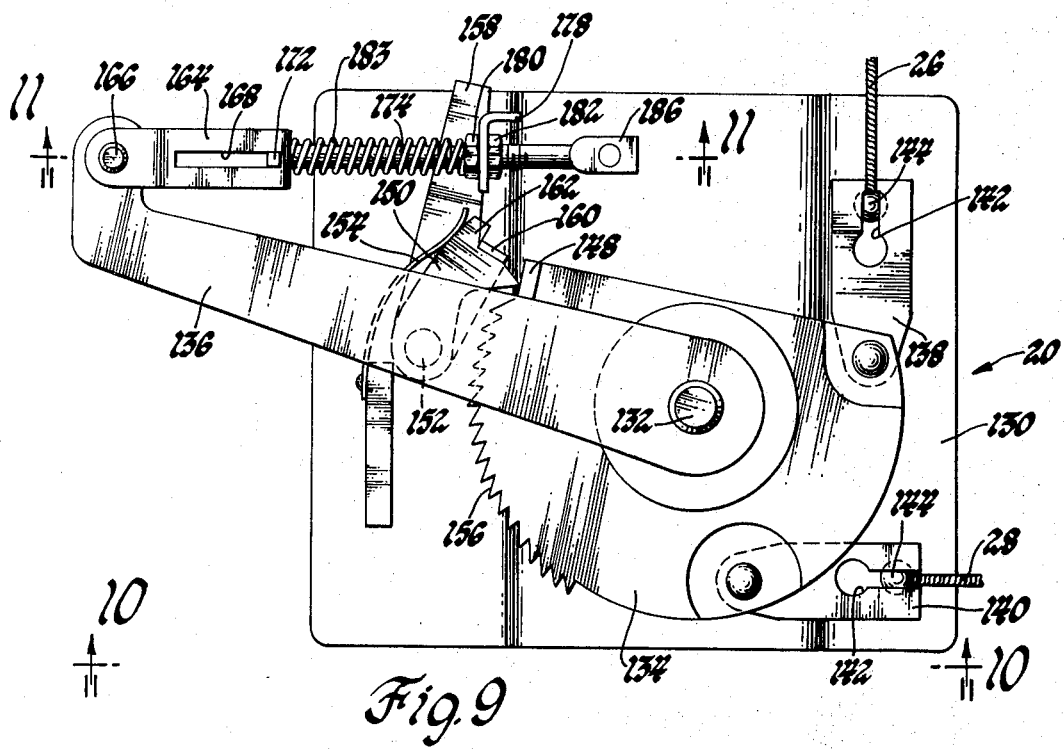
FIG. 9 is a plan view of the parking brake actuator of FIG. 1.
Figure 10:
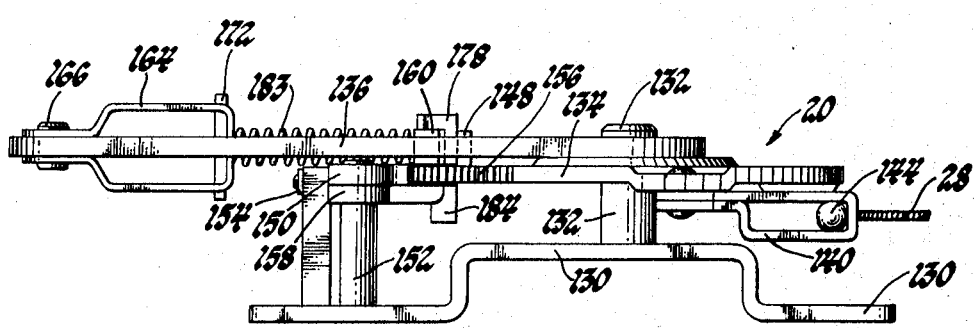
FIG. 10 is an elevation view in the direction of arrows 10—10 of FIG. 9.
Figure 11:
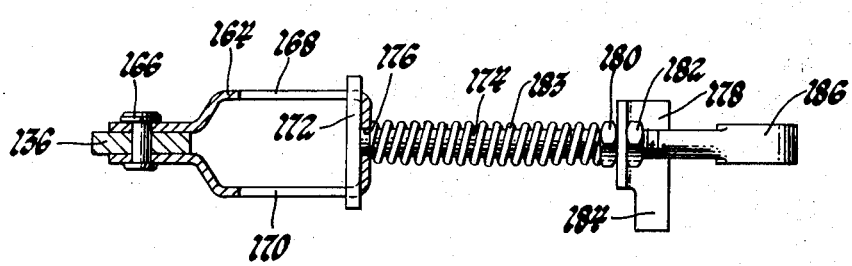
FIG. 11 is a sectional view taken in the direction of arrows 11—11 of FIG. 9.

Referring to FIG. 9, 10 and 11, the parking brake actuator 20 is shown. A bracket 130 serves as the base of the parking brake actuator 20 and is suitably fixed to a stationary vehicle member. Bracket 130 has a pivot shaft 132 which pivotally mounts a ratchet member 134 and an apply lever 136. Ratchet member 134 has a clevis 138 and a clevis 140 pivotally mounted thereto. Each clevis has a key hole slot 142 which respectively receive balls 144 attached to the ends of the respective brake actuating cables 26 and 28 to attach the brake cables to the ratchet member 134.

An upstanding tang 148 of the ratchet member 134 is engaged by the actuating lever 136 upon clockwise rotary movement of the actuating lever 136 to rotate the ratchet member 134 and thereby tension the brake cables 26 and 28. A pawl 150 is pivotally mounted on the bracket 130 by pivot pin 152 and is biased by a spring 154 into engagement of ratchet teeth 156 displayed on an arcuate segment of the ratchet member 134. Thus it will be apparent that the pawl locks the ratchet member 134 in brake applied position even though the actuating lever 136 is returned to its rest position of FIG. 9.

Pivot pin 152 of the bracket 130 also pivotally mounts a release lever 158 having an upstanding tang 160 which is engageable with an abutment 162 of the pawl 150 to rotate the pawl 150 out of engagement with the ratchet teeth 156 upon counterclockwise movement of the release lever 158 from its normal position of FIG. 9.

Referring to FIG. 11 the attachment between the push-pull cable 24 assembly and the actuating lever 136 is shown. A clevis 164 is pivotally attached to the actuating lever 136 by a pivot pin 166. The clevis has aligned slots 168 and 170 which receive a pin 172 extending laterally from a rod 174 extending through an aperture 176 in the end of the clevis 164. A bracket 178 is mounted on the rod 174 by nuts 180 and 182. A coil compression spring 183 surrounds the rod 174 and acts between bracket 178 and clevis 164 to urge the rod 174 to its normal position relative the clevis 164 as shown in the drawing. Bracket 178 has a downwardly extending tang 184 which engages the end of release lever 158 when the rod 174 is in its normal position of the drawings. Push-pull cable assembly 24 is suitably connected to the apertured end 186 of rod 174.

Thus with reference to the parking brake actuator 20 of FIGS. 9, 10, and 11 it will be apparent that tensioning the push-pull cable assembly 24 will pull rod 174 rearwardly to rotate actuating lever 136 and ratchet member 134 clockwise to tension the brake cables 26 and 28. The tension in push-pull cable assembly 24 may then be relieved to return the actuating lever 136 to the normal position of FIG. 9, while the pawl 150 holds the ratchet member 134 in the brake applied position.

When the rod 174 is pushed forwardly by the push-pull cable 24, the rod 174 moves into clevis 164 as permitted by movement of the pin 172 in the slots 168 and 170 so that the tang 184 of bracket 178 rotates release lever 158 counterclockwise to thereby carry the pawl 150 out of engagement with the ratchet member 134 to release the tension on the parking brake cables 26 and 28 and thereby release the parking brakes 10 and 12.

Figure 2:
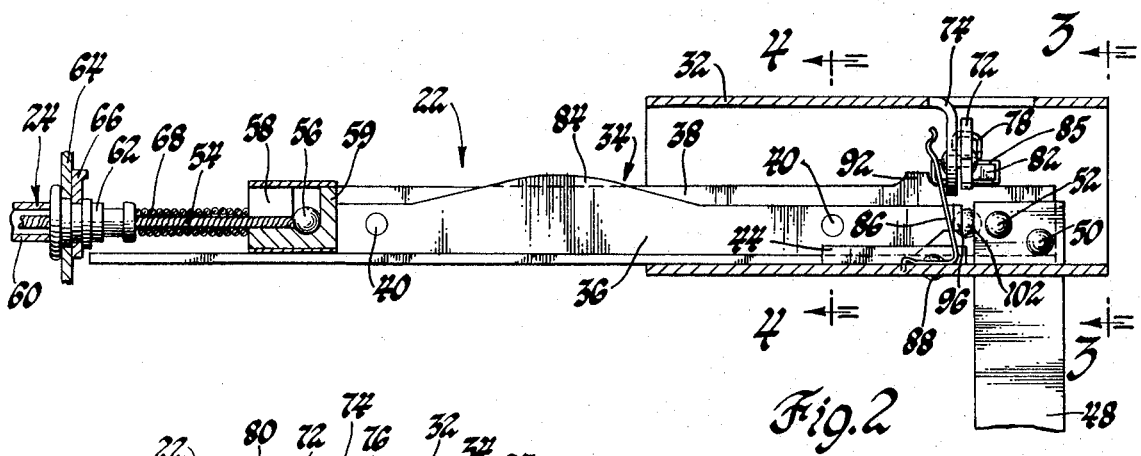
FIG. 2 is a sectional view of the parking brake apply mechanism taken in the direction of arrows 2—2 of FIG. 1.
Figure 4:
FIG. 4 is a sectional view taken in the direction of arrows 4—4 of FIG. 2.

Referring to FIG. 2, the parking brake apply mechanism includes a stationary rectangular tubular member 32 which is suitably fixed to a stationary member of the vehicle body. A handle assembly, generally indicated at 34, includes a pair of flanged bars 36 and 38 connected together in laterally spaced relation by rivets 40 and sleeves 42 as best seen in FIG. 4. The flanged bars 36 and 38 have flanges or legs extending laterally thereof and engaged respectively by slide members 44 and 46 which hold the flanges against the wall of the tubular member 32 so as to permit longitudinal sliding movement of the handle assembly 34 within the tubular member 32. The handle assembly 34 includes a hand grip 48 attached to the flanged bars 36 and 38 by rivets 50 and 52 to facilitate movement of the handle assembly 34 by the vehicle operator.

The forward end of the handle assembly 34 is suitably connected to the cable 54 of the push-pull cable assembly 24 by suitable means which may for example be a ball 56 engaged on the end of the cable 54 and received in an upwardly opening key hole slot 58 in a block 59 attached to the forward end of the handle assembly 34. The cable 54 is routed into a sheath 60 of the push-pull cable assembly 24 through a fitting 62 which extends through the wall 64 of the vehicle and is attached thereto by a clip 66. A spring 68 surrounds cable 54 and acts between fitting 62 and the block 59 of the handle assembly 34 to urge the handle assembly 34 rearwardly towards the vehicle operator.

Figure 3:
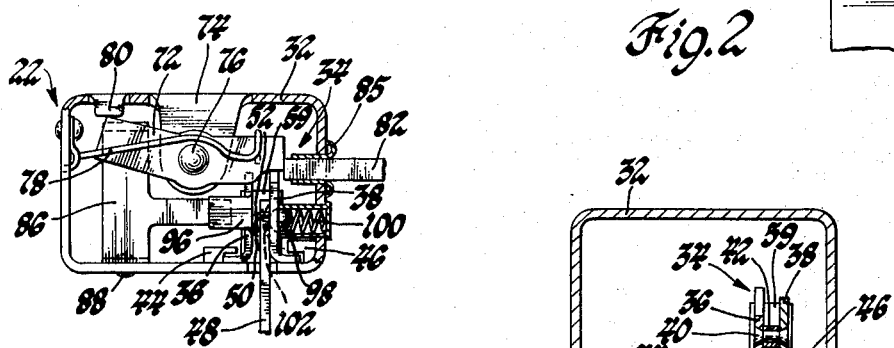
FIG. 3 is an end view of the parking brake apply mechanism taken in the direction of arrow 3—3 of FIG. 2.

Referring to FIGS. 2 and 3, an interlock between the ignition switch 30 and the parking brake apply mechanism 22 includes a toggle link 72 pivotally attached to a downwardly extending tang 74 of the tubular member 34 by a pivot pin 76. A spring 78 engages the toggle link 72 urging it into engagement of a second downwardly extending tang 80 of the tubular member 32 to define the normal position of the toggle link 72. A plunger 82 extends into the tubular member 32 through a bushing 85 and is aligned with the toggle link 72. The plunger 82 is operatively connected to the ignition switch 30 by a push-pull cable 83 or equivalent means so that when the ignition switch is turned to locked position the plunger is moved further into the tubular member 34 from its position of FIG. 3, and then when the ignition is again moved to unlocked position, the plunger 82 is withdrawn to its position of FIG. 3. When the plunger 82 is in ignition unlocked position of FIG. 3, the end of the plunger 82 engages the toggle link 72 to prevent movement of the plunger 82 into the tubular member 32 and, accordingly, prevents movement of the ignition to locked position. Before the vehicle operator can turn the ignition to locked position, the handle assembly 34 must be pulled rearwardly to apply the parking brake.

Referring to FIGS. 5 and 8, it will be seen that the handle assembly 34 has been pulled rearwardly to such an extent that a raised cam surface 84 on the flanged bar 36 has lifted the toggle link 72 from its position of FIG. 3 to the position of FIG. 8 so that the plunger 82 may move further into the tubular member 32 to permit movement of the ignition lock to locked position. The cam surface 84 is situated on the flanged bar 36 so as to lift the toggle link 72 only when the parking brake has been actuated to a predetermined extent. When the cam surface 84 lifts the toggle link 72 to its position of FIG. 8, a clip 86 attached to the tubular rectangular member 32 by a rivet 88 engages the toggle link 72 to retain it in its position of FIG. 8 against the bias of the spring 78. Thus, when the handle assembly 34 is moved further rearwardly to its full brake apply position of FIG. 6 wherein the cam surface is moved out of engagement with the toggle link 72, the toggle link 72 is retained in its position of FIG. 8 by the clip 86.

Once the handle assembly 34 has been pulled rearwardly to apply the brakes, it may be pushed forwardly to the retracted position or stored position of FIG. 7 so as to permit ease of driver egress and ingress to the vehicle. This forward movement of the handle assembly 34 to retracted position is limited by the engagement of an upstanding shoulder 92 of the flanged bar 38 with the plunger 82. Thus the handle assembly 34 cannot be pushed forwardly of this normal retracted position to release the parking brake as long as the plunger 82 is in its FIG. 8 position corresponding to the ignition being locked. When the vehicle operator inserts the key and turns the ignition to unlocked position the plunger 82 is withdrawn to its position of FIG. 3. Then the vehicle operator may push the handle assembly 34 forwardly to its position of FIG. 2, thereby causing forward movement of the cable 54 to rotate the release lever 158 of the actuator 20 counterclockwise to release the brakes as described hereinbefore. Referring to FIG. 2 it will be seen that a laterally extending tang 96 of the flanged bar 36 engages and moves the clip 86 out of engagement with the toggle link 72 permitting the spring 78 to return the toggle link 72 to its position of FIG. 3 so as to again engage the end of plunger 82 and thereby prevent the ignition switch from being returned to locked position until such time as the parking brake is once again actuated.

The handle assembly 34 is urged rearwardly to its normal stored position of FIG. 7 by action of the spring 68 and is held in this position against the bias of spring 68 by a ball 98, best seen in FIG. 3, which is biased by a spring 100 into a depression 102 of the flanged bar 38.

Thus it is seen that a retractable parking brake apply lever is provided having an interlock to the vehicle ignition so that the ignition switch cannot be turned to locked position until the parking brake has been actuated and the parking brake cannot be released until the ignition is turned to unlocked position. It will be apparent that the invention is not limited for use upon movement of the ignition lock between locked and unlocked position but may be adapted for use upon ignition lock movement between any first and second positions.

What is claimed is:

1. In a motor vehicle having an ignition lock and a parking brake, a parking brake operating member having a normal retracted position and being movable in one direction from the normal retracted position to apply the parking brake and movable in the other direction from the normal retracted position to release the parking brake, the improvement comprising; the parking brake operating member having a cam surface thereon, toggle means spring biased to a normal position relative the operating member, the cam surface of the operating member engaging and moving the toggle means from the normal position when the operating member is moved in the brake applying direction, and plunger means operatively connected to the ignition lock and being movable in response to movement of the ignition lock between one position and another position, the toggle means engaging the plunger means when in the normal position to prevent movement of the plunger whereby ignition lock movement to one of the positions is permitted only when the toggle is moved from the normal position by movment of the operating member in the one direction to apply the parking brake 2. In a motor vehicle having an ignition lock and a parking brake, a stationary member, a parking brake operating member movably mounted on the stationary member and having a normal retracted position and being movable in one direction from the normal position to apply the parking brake and movable in the other direction from the normal position to release the parking brake, the improvement comprising; a cam surface and a shoulder in laterally and longitudinally spaced relation on the parking brake operating member, toggle means pivotally mounted on the stationary member, spring means biasing the toggle means to a normal position, plunger means operatively connected to the ignition lock and being movable within the stationary member in response to movement of the ignition lock between first and second positions, the toggle means engaging the plunger means when in the normal position to prevent movement of the plunger and the ignition lock from the first position to the second position, the cam surface of the operating member engaging and pivoting the toggle means from the normal position when the operating member is moved in the brake applying direction to permit movement of the plunger and ignition lock from the first position to the second position, the shoulder on the handle assembly engaging the plunger when the handle assembly is in the normal position and the ignition is in second position to prevent movement of the handle assembly in the direction to release the parking brake until the ignition is returned to first position.

3. In a motor vehicle having an ignition lock and a parking brake, a stationary member, a parking brake operating member movably mounted on the stationary member and having a normal retracted position and being movable in one direction from the normal position to apply the parking brake and movable in the other direction from the normal position to release the parking brake, the improvement comprising; a cam surface and a shoulder in laterally and longitudinally spaced relation on the parking brake operating member, toggle means pivotally mounted on the stationary member, spring means biasing the toggle means to a normal position, plunger means operatively connected to the ignition lock and being movable within the stationary member in response to movement of the ignition lock between first and second positions, the toggle means engaging the plunger means when in the normal position to prevent movement of the plunger and the ignition lock from the first position to the second position, the cam surface of the operating member engaging and pivoting the toggle means from the normal position when the operating member is moved in the brake applying direction to permit movement of the plunger and ignition lock from the first position to the second position, and means acting to retain the toggle link in pivoted position when the handle assembly is returned from the brake applying direction to the normal position, the shoulder on the handle assembly engaging the plunger when the handle assembly is in the normal position and the ignition lock is in the second position to prevent movement of the handle assembly in the direction to release the parking brake until the ignition lock is returned to first position.

4. In a motor vehicle having an ignition lock and a parking brake, the combination comprising; a parking brake operating member mounted in the motor vehicle for forward and rearward movement and having a normal retracted storage position, the operating member being movable in the rearward direction from the storage position to apply the parking brake and movable in the forward direction from the normal storage position to release the parking brake, movable toggle means having a normal position relative the operating member, plunger means operatively connected to the ignition lock and being movable relative the operating member in response to movement of the ignition lock between first and second positions, the plunger means engaging the toggle means when the toggle means is in the normal position to prevent movement of the ignition lock from the first position to the second position, a cam surface on the operating member engaging and moving the toggle means from the normal position and out of engagement with the plunger means when the operating member is moved rearwardly to apply the parking brake to permit movement of the ignition lock from the first position to the second position, and means acting to retain the toggle link out of engagement with the plunger means until the parking brake is released by movement of the operating member forwardly of the normal storage position.

* * * * *